United States Patent
Toriya

Patent Number: 6,052,564
Date of Patent: Apr. 18, 2000

[54] PORTABLE INDIVIDUAL CALLING DEVICE

[75] Inventor: Michio Toriya, Tokyo, Japan

[73] Assignee: Uniden Corporation, Tokyo, Japan

[21] Appl. No.: 08/884,659

[22] Filed: Jun. 27, 1997

[30] Foreign Application Priority Data

Mar. 13, 1997 [JP] Japan ................................. 9-058671

[51] Int. Cl.[7] .................................................. H04Q 7/18
[52] U.S. Cl. .......................... 455/38.3; 455/343; 455/566; 455/574; 455/63
[58] Field of Search ..................... 455/38.3, 227, 455/228, 343, 566, 574, 38.4, 63; 340/825.44, 825.47, 825.21, 825.22, 311.1; 370/311, 313

[56] References Cited

U.S. PATENT DOCUMENTS

| | | | |
|---|---|---|---|
| 5,764,731 | 6/1998 | Yablon | 379/88 |
| 5,768,701 | 6/1998 | Asai | 455/343 |
| 5,793,303 | 8/1998 | Koga | 340/825.44 |
| 5,832,366 | 11/1998 | Umetsu | 455/38.3 |
| 5,835,023 | 11/1998 | Ito et al. | 340/825.44 |

FOREIGN PATENT DOCUMENTS

| | | |
|---|---|---|
| 2-141034 | 5/1990 | Japan . |
| 3-218127 | 9/1991 | Japan . |
| 4-304042 | 10/1992 | Japan . |

*Primary Examiner*—Wellington Chin
*Assistant Examiner*—Yemane Woldetatios
*Attorney, Agent, or Firm*—McDermott, Will & Emery

[57] ABSTRACT

The present invention provides a portable individual calling device which performs no indication on the LCD indicator as a measure for preventing decrease in signal-receiving sensitiveness due to CPU noises, wherein the non-indication time period is shortened. For this purpose, the portable individual calling device comprises a receiving unit for receiving a radio signal which contains a selective calling number and message information, an LCD indicator for indicating message information, an address detecting unit for detecting whether the received signal contains its personal selective calling number, and a controlling unit for reading out message information from the received signal in correspondence with the detection of its personal selective calling number and for subjecting such information to data processing. The controlling unit suspends the indication operations of the LCD indicator for the time period from the detection of its personal selective calling number to the completion of the data processing, during which the CPU is in a high speed operation state.

8 Claims, 6 Drawing Sheets

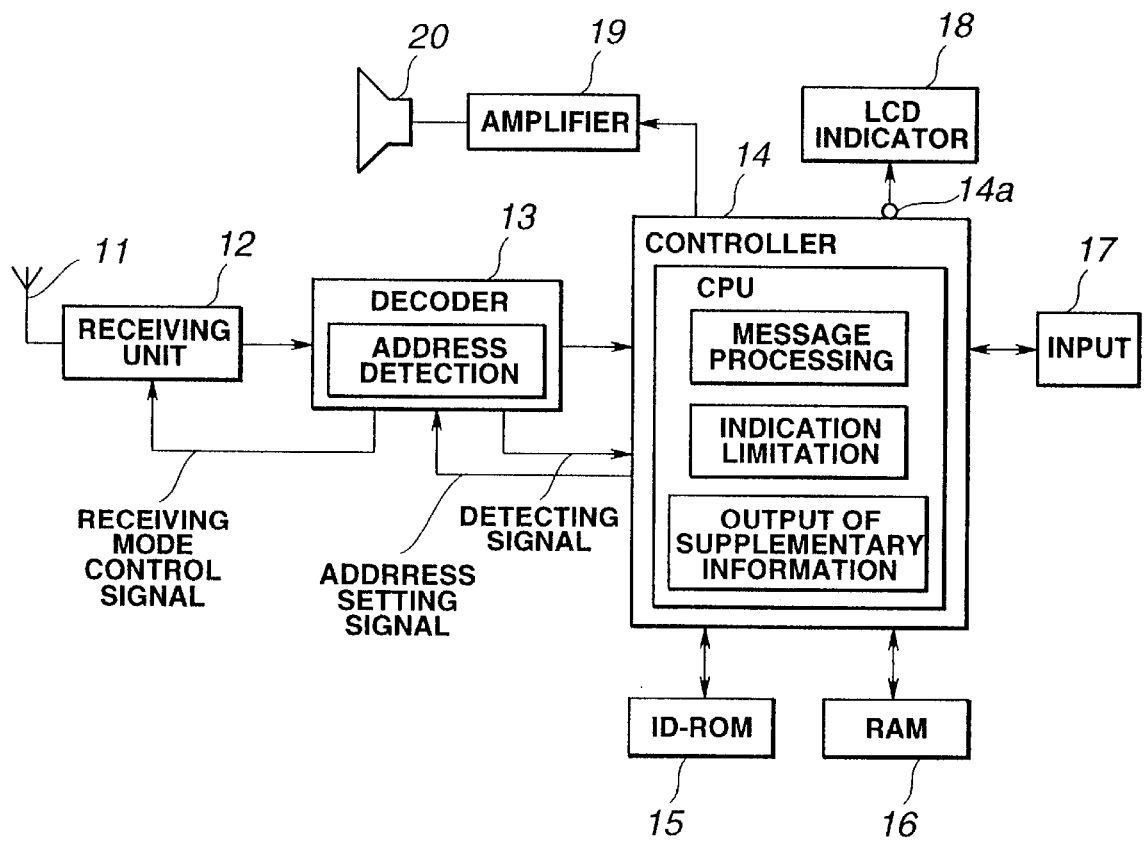
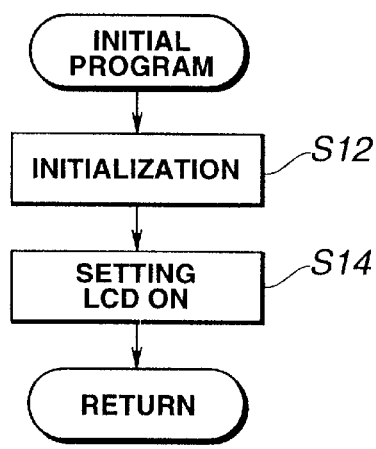

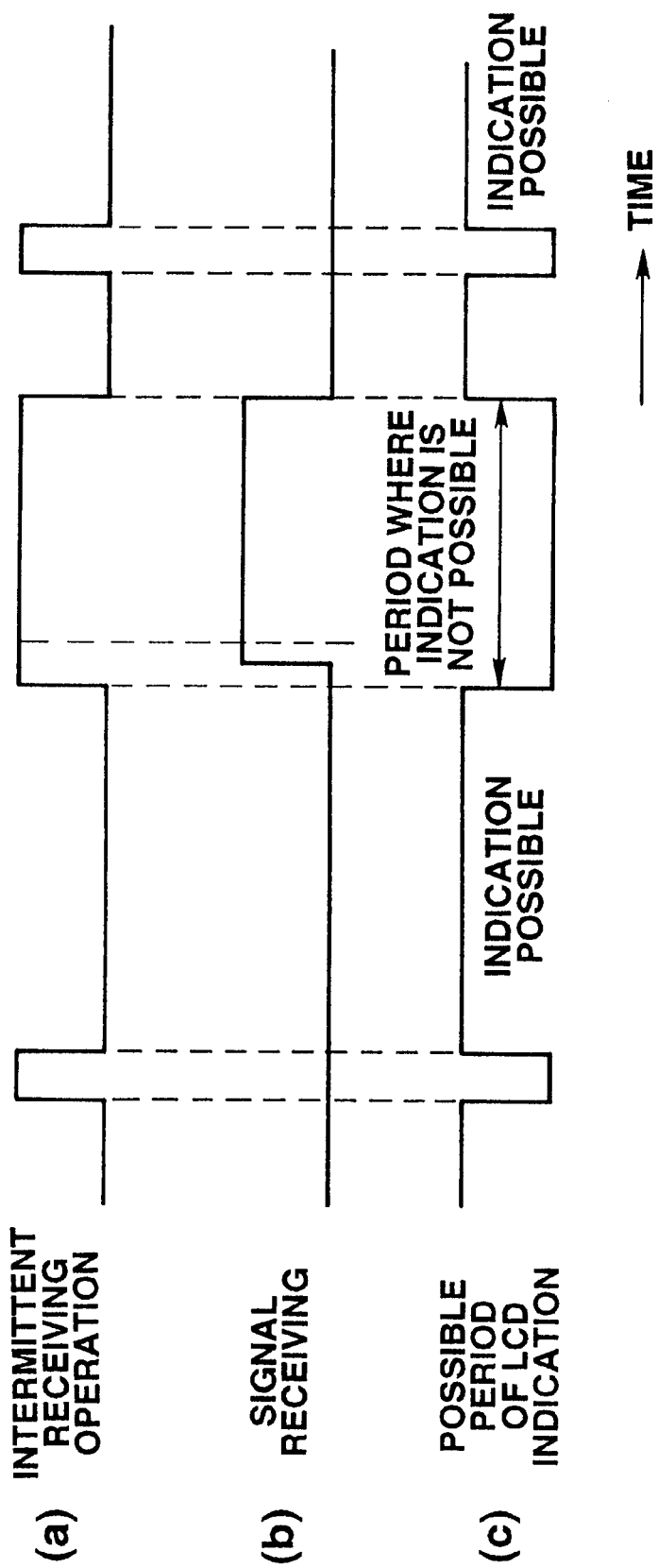

PORTABLE INDIVIDUAL CALLING DEVICE

BACKGROUND OF INVENTION

Field of the Invention

The present invention generally relates to an improved portable individual calling device, and in particular, to a portable individual calling device which temporarily performs no indications on the screen display for noise countermeasures, wherein the non-indication time is shortened.

Description of the Prior Art

A portable individual calling device receives a radio signal transmitted from a base station, judges whether a selective calling number allocated in advance to the device is included in the received signal, and if included, informs the person holding the device of that he has received a call by such methods as the flashing of an LED or the driving of a speaker. As an additional function, if any messages are included in the received signal, the device indicates the messages on an indicator such as an LCD (liquid-crystal display). A characteristic example of this portable individual calling device is the so-called "pager".

This type of portable individual calling device utilizes a built-in battery as its driving power source. In order to lengthen the time during which the portable individual calling device can be used, it is necessary to reduce power consumption and prolong battery life. Therefore, a portable individual calling device having an intermittent receiving function has been proposed for overcoming these problems. This device utilizes the receiving function in an intermittent way, since said function consumes a comparatively large amount of power. As for the rest of the time, this device uses only the minimum necessary functions in order to suppress power consumption. Furthermore, the power consumption is reduced by having the CPU (central processing unit) to work in two steps, namely the low speed operation (or sleep condition) and the high speed operation, in correspondence with the intermittent operation above.

The portable individual calling device needs to be made compact to allow such device to be portable. This structural limitation causes the built-in CPU as the controlling and data processing unit to be arranged closely in the vicinity of the antenna and radio receiving unit.

Therefore, when the CPU performs a data processing in the state of high speed operation, the harmonic noise generated by the CPU increases, affecting the signal receiving. In particular, the harmonics leaking from the wirings which extend from the CPU's LCD driving port to the LCD indicator having a long, matrix-shaped inner wiring structure, intrudes into the radio receiving unit, and thereby causes reduction of the signal-to-noise ratio of the receiving unit.

One means for resolving these inconveniences is disclosed in Patent Laid-Open Hei 2(1990)-141034 Publication.

As shown in FIG. 7, the invention described in this publication functions to reduce the effect of noise generated during operations of the CPU (especially operations involving a high-speed clock), and performs no indications via the LCD indicator during each of the signal-receiving operations of the intermittent operation, thereby preventing a decline in the signal-receiving sensitiveness during the signal-receiving mode.

Examples of other prior arts are the radio selective-calling receivers described in Patent Laid-Open Hei 3(1991)-218127 Publication and Patent Laid-Open Hei 4(1992)-304042 Publication. The first example discloses a radio selective calling receiver which can prevent the decline of signal-receiving sensitiveness which is a consequence of the lowering battery voltage. The second example discloses a radio selective calling receiver which can make the capacity of the signal-receiving buffer memory smaller without causing decline in sensitiveness due to noises by CPU operation.

The portable individual calling devices described above informs the device-holder of a call with ringing sounds and the LED when a signal selecting such device has arrived. In addition, if the holder pushes a read out switch of the portable individual calling device, any messages added in the received signal are indicated on the LCD indicator of the portable individual calling device.

Portable individual calling devices as described above are increasingly provided with multi-functions, and the LCD indicator is used as the display screen for a plurality of assistance functions (so-called convenient functions). These are, for example, in addition to the conventional number, symbol and letter indications, indications of time/date and weekday via built-in clock/calendar functions, indication of the remaining battery power, warning for recharging the battery, signal-receiving sensitiveness, communicable areas, sound volume, notes of telephone numbers, and mascots, etc.

Therefore, the method of use is changing from a temporary screen display via an LCD indicator for reading messages, to the constant indication state on the LCD indicator. The CPU's high-speed operation for processing the received data still allows noises to intrude in the antenna/receiving unit when using the LCD indicator in a constantly indicative state.

However, in the conventional noise preventing method where the LCD indicator is turned off during each of the intermittent signal-receiving periods as shown in FIG. 7, periods which allow no indications on the LCD display are inserted many times in correspondence with the intermittent receiving signals. This causes inconveniences to the device holder when viewing the LCD indicator. Furthermore, when the pushing operation of the message read-out switch by the device holder overlaps with an intermittent signal receiving period, the operation of the read-out switch is disregarded, and as this occurrence probability is relatively high, it is not preferable.

SUMMARY OF THE INVENTION

It is an object of the present invention to provide a portable individual calling device which temporarily performs no indication on its indicator as a countermeasure against the decline in signal-receiving sensitiveness due to CPU noises, wherein the non-indication time is made much shorter.

In order to achieve the above object, the portable individual calling device according to the present invention comprises a receiver (12) which receives a radio signal containing a selective calling number and/or message information through intermittent receiving operations and which outputs such radio signal to a predetermined format as the received signal, a message indicator (18) for indicating the message information, an address detector (13) for detecting whether the received signal contains its personal selective calling number, a message processor (14) for reading the message information from the received signal corresponding to the detection of the personal selective calling number to subject such information to data processing, and an indication limiter (14) for suspending the indication by the message indicator during the time period from the detection of its personal selective calling number to at least the completion of the data processing.

Preferably, the message processor is composed of a microcomputer system which operates in at least two calculation speeds, namely low-speed and high-speed, which performs high-speed calculation processing from the detection of its personal selective calling number up to the completion of the data processing. The message indicator is an LCD indicator to be connected to the output port of the microcomputer system.

Preferably, the indication limiter (14) shuts down the output port to which the LCD indicator of the microcomputer system is connected, in correspondence with the detection of the personal selective calling number (S26). The message processor stores the processed message information in a storage (16). Thereafter, the indication limiter opens the output port (S36).

Preferably, the indication limiter comprises an indication suspender (S26) for suspending the indication operation by the message indicator in correspondence with the detection of the personal selective calling number, and a re-indicator (S36) for causing the message indicator to start operation after the completion of the data processing.

Preferably, the indication suspender shuts down the output port of the microcomputer system in correspondence with the detection of the personal selective calling number. The message processor stores the processed message information in a storage (16). Thereafter, the re-indicator opens the output port.

Preferably, the portable individual calling device according to the present invention further comprises an assistance information outputor for the output of assistance information which is useful when using the calling device, wherein the message indicator may indicate the assistance information and the message information simultaneously or separately.

Furthermore, the assistance information contains, without limitation, at least one of the information regarding the date, weekday, time, timer, or name and telephone number stored in memory.

DESCRIPTION OF DRAWINGS

FIG. 1 is a schematic block diagram showing an example of the portable individual calling device according to the present invention.

FIG. 2 is a flow chart describing the starting operation of the device.

FIG. 7 is a timing chart describing examples of the operations of a conventional calling device.

DETAILED DESCRIPTION OF THE EMBODIMENT

Figure 3:
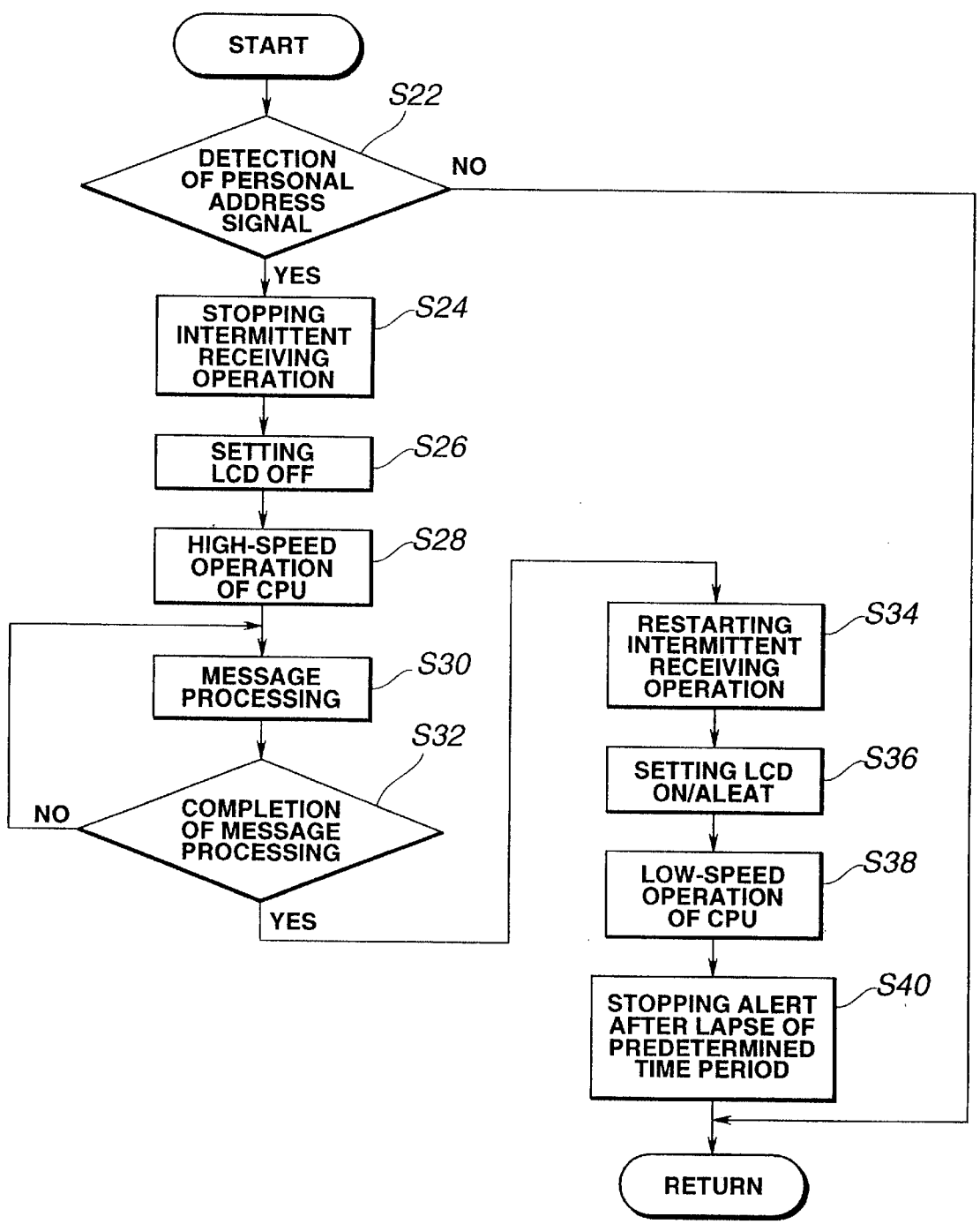
FIG. 3 is a flow chart describing the operations of the calling device.

Now, an embodiment of the present invention will be explained by referring to the drawings. FIG. 1 indicates a block diagram indicating the circuit structure of the portable individual calling device in general. In this drawing, 11 indicates a built-in antenna in the calling device, 12 indicates a receiving unit for demodulating the received radio-frequency signal to a binary base band signal, 13 indicates a decoder for detecting synchronized signals from the base band signals, decoding the data signals, and performing detection of its personal selective calling numbers (address detection), etc., and 14 indicates a controlling unit. The controlling unit is composed of a one-chip CPU made by integrating the required components such as ROM, RAM, cash memory, CPU, I/O port on one chip to form a computer system.

This CPU implements data processing for message processing, etc. and various controlling processes such as the control of the LCD indicator and calling sound, and further, realizes the function of a clock/calendar for the indication of time or date (weekday) on the display screen, an alarm function for generating an alarm signal at the designated time, and assistance information output functions including the display of various assistance information, such as the function of a telephone bank for indicating the names and telephone numbers stored in memory, via a program integrated in the ROM. The CPU can operate at two speeds, namely low speed and high speed, in order to conserve electric power.

14a indicates an output port for driving the LCD indicator described below, 15 indicates an ID-ROM for holding its personal selective calling number, 16 indicates a RAM which holds received messages, etc., 17 indicates an input portion composed of various functional switches of the device, such as for power, message read-out and time input, etc., 18 indicates an LCD indicator for indicating the received messages or current time, etc., 19 indicates an amplifier for amplifying the calling signals and 20 indicates a speaker for converting the calling signal to sound.

This kind of structure allows the signal received by the built-in antenna 11 to be amplified in the radio receiving unit 12, then demodulated, shaped to a waveform, and then supplied to decoder 13. Decoder 13 generates a decoding timing by utilizing the synchronized information portions of the received digitalized signal (received data), performs discrimination of the arrangement of the received data, and separates the selective calling number (address) from the received data. Decoder 13 makes receiving unit 12 perform intermittent receiving operation via a receiving mode control signal.

Decoder 13 contains an address detecting portion. The address detecting portion is, for example, composed of a shift register to be supplied with the received signal, and a logical circuit which compares the output of each bit of this shift register with the output of the register holding its personal calling number at the timing of distinction of the address signal portion. The address detecting unit determines whether the separated selective calling number concurs with its personal selective calling number, and if they concur, the address detecting unit supplies the detected personal selective calling signal to the controlling unit 14 as a CPU interruption signal, and sets up a detection flag. Decoder 12 performs the error correction in the data signals sent subsequently after its personal selective calling number, and supplies controlling unit 14 with the decoded data signals. The personal selective calling number is read out from ID-ROM 15 via the CPU of controlling unit 14, and set inside the memory (register) in decoder 13. This CPU is able to work in at least two modes of operation, namely low speed and high speed for the conservation of electric power.

After receiving the detection signal of its personal selective calling number from decoder 13, the CPU of controlling unit 14, if in its normal state (a state where no message is indicated), suspends its indication operation by cutting off driving port 14a of LCD indicator 18 which displays the time and remaining battery power, etc., and rapidly performs the message processing and stores the message in RAM 16, by switching the clock for CPU to a high speed operation. After completing the message storage, the driving port of LCD indicator 18 is reopened to restart the indication. Thereafter, the CPU makes speaker 20 operate to inform the device-holder of the signal arrival for a predetermined period of time, through a calling sound or through vibration by causing a vibrator (not illustrated) to start operation.

When the holder pushes a message read-out switch (not illustrated) on input portion 17, CPU causes the received message to be indicated on the screen by forwarding data from RAM 16 to LCD indicator 18.

In this way, the portable individual calling device informs the device-holder that it has received a call, and of the message.

Now, the operation of the portable individual calling device with the structure above will be described in detail by referring to the flow charts.

First, when the device-holder turns on the power switch of the calling device, the CPU of controlling unit 14 performs the initialization routine after the power input as shown in FIG. 2. During this routine, initialization for each of the units is performed, such as the setting of its personal selective calling number at decoder 13 via an address setting signal, and the intermittent signal-receiving operation for receiving unit 12 is commenced (S12). The CPU drives LCD indicator 18 to an operating state, and performs the waiting screen indication for the indication of time, weekday and date, etc. through CPU-integrated clock/calendar functions (S14). Thereafter, it goes into a waiting state.

FIG. 3 indicates a flow chart for explaining the operation of the signal arrival of the portable individual calling device. The calling device performs the intermittent receiving operation at approximately 1 second intervals to detect the arrival of received signals, as shown in FIG. 4(a).

Figure 5:
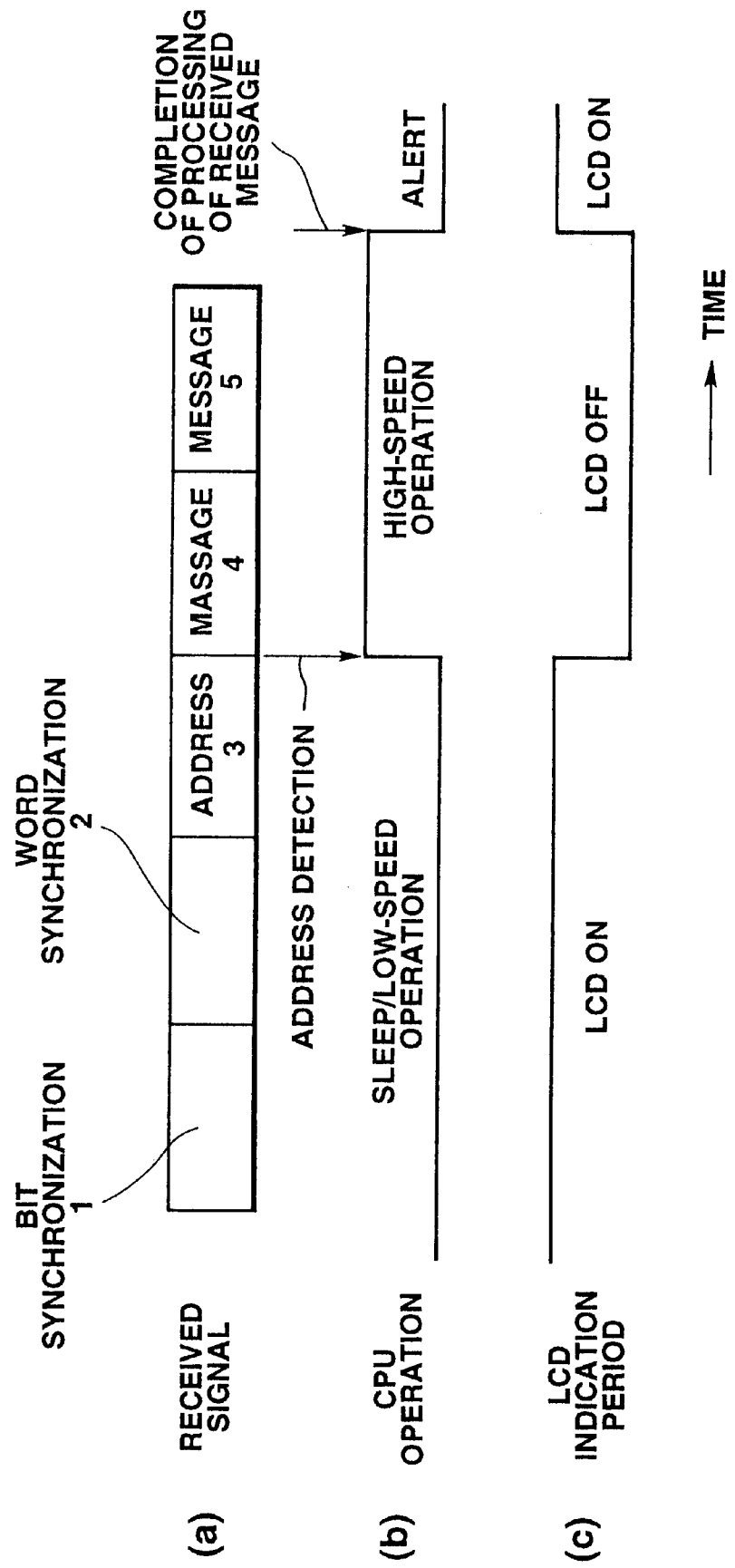
FIG. 5 is an explanatory diagram of the operations of signal receiving and others of the device.

As shown for example in FIG. 5(a), the received signal is made of bit synchronization portion 1, word synchronization portion 2, address portion 3, message portion 4, message portion 5, . . . message portion n, and the address portion includes the selective calling number (calling information).

Figure 4:
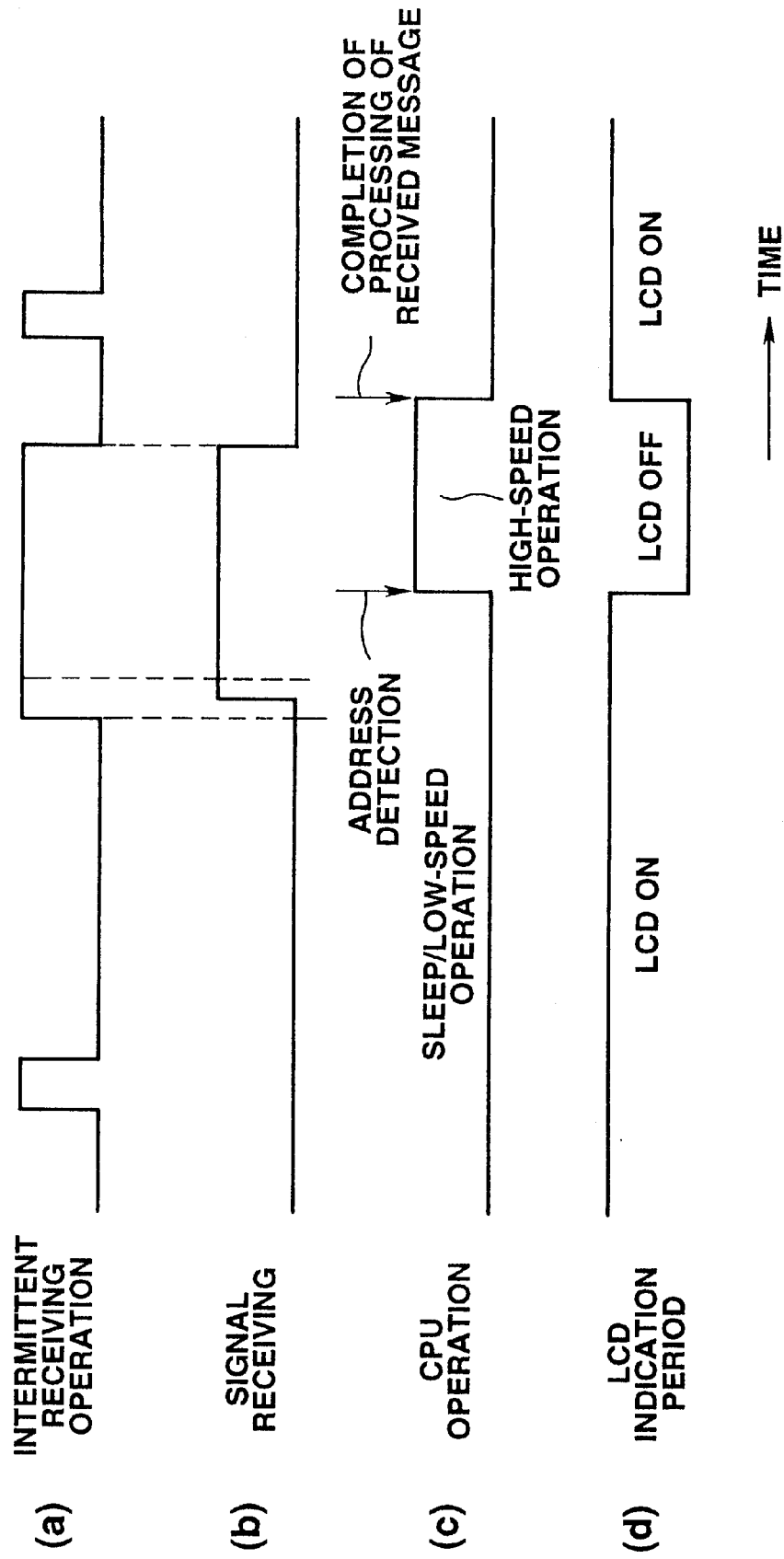
FIG. 4 is a timing chart describing the operations of the calling device.

As shown in FIG. 4(b), when the calling device receives a signal, the address detecting unit of decoder 13 compares the selective calling number of address portion 3 of the received signal with its personal address signal (calling number) and judges whether they concur. If they concur, the device gives the detected interruption signal to controlling unit 14 of the CPU. If they do not concur, the device waits for the next calling signal to arrive (S22).

When the address detection portion detects its personal selective calling signal (S22, YES), the operation of the receiving unit changes from intermittent receiving operation to continuous receiving operation (S24). Then, the CPU, for example, shuts down indication output port 14a which drives LCD indicator 18 of CPU 14, cuts off the power supply and driving signals, and suspends the driving of LCD indicator 18 (S26). Thereby, CPU noises are prevented from intruding into the radio receiving system (11, 12) from the LCD system which has a large amount of wiring. Here, the step of switching LCD indicator 18 from the indication state to the non-indication state is in correspondence with the indication suspender.

Then, as shown in FIG. 5(b), the CPU, in correspondence with the address detection, transfers from the low-speed (or sleep) operation to a high-speed operation state (S28). The CPU performs high-speed message processing for each message received to allow indication of the message on LCD indicator 18 (S30, S32; NO). Message processing is performed in such a manner that numbers, codes, letters and pre-registered fixed phrases (fixed messages), and the selective number of a designated calling sound where the calling sound can be designated when the sender makes a calls etc., are decoded from the coded data of the message portion of the received signal. The CPU stores such information in RAM 16.

When the CPU completes message processing for the last message of the received signal (S32, YES), the intermittent receiving operation of the receiving unit (S34) is restarted. Then, the CPU, for example, opens the output port 14a to the indicator, and supplies power and driving signals to cause LCD indicator 18 to be in the indication state. Then, the calling sound (alert) of the type selected in advance or designated by the sender's message is generated (S36). Here, the step of switching LCD indicator 18 from the non-indication state to the indication state via the CPU is in correspondence with the re-indicator.

Thereafter, the CPU returns from the high-speed operation to the low-speed operation (or sleep) state. After a predetermined period of time has lapsed from the alert generation, the generation of the calling sound is suspended (S40). Thereafter, the CPU turns into a signal receiving waiting state.

As a result of the operations described above, LCD indicator 18 is only in the off-state during the period from its address detection (detection of call arrival), where the CPU performs high-speed operation, up to the end of the processing of the received message, as shown in FIGS. 4(c) and 4(d). Therefore, the period of time wherein the screen display cannot be performed may be considerably shortened in comparison to the indication time with conventional LCD indicators, as shown in FIG. 7(c).

For example, assuming there are ten calls in one day, and the time required for high speed processing of the CPU per call is one second, then the rate of the period of time where no indication is performed on LCD indicator 18 is 10 seconds/(60×60×24) seconds per day. When the device holder cannot immediately look at the LCD indicator 18 immediately, this process will be shortened and canceled. Further, after the non-indication state, the device changes to the operation of signal arrival, thus, the holder's feeling of uncomfortableness is small.

Figure 6:
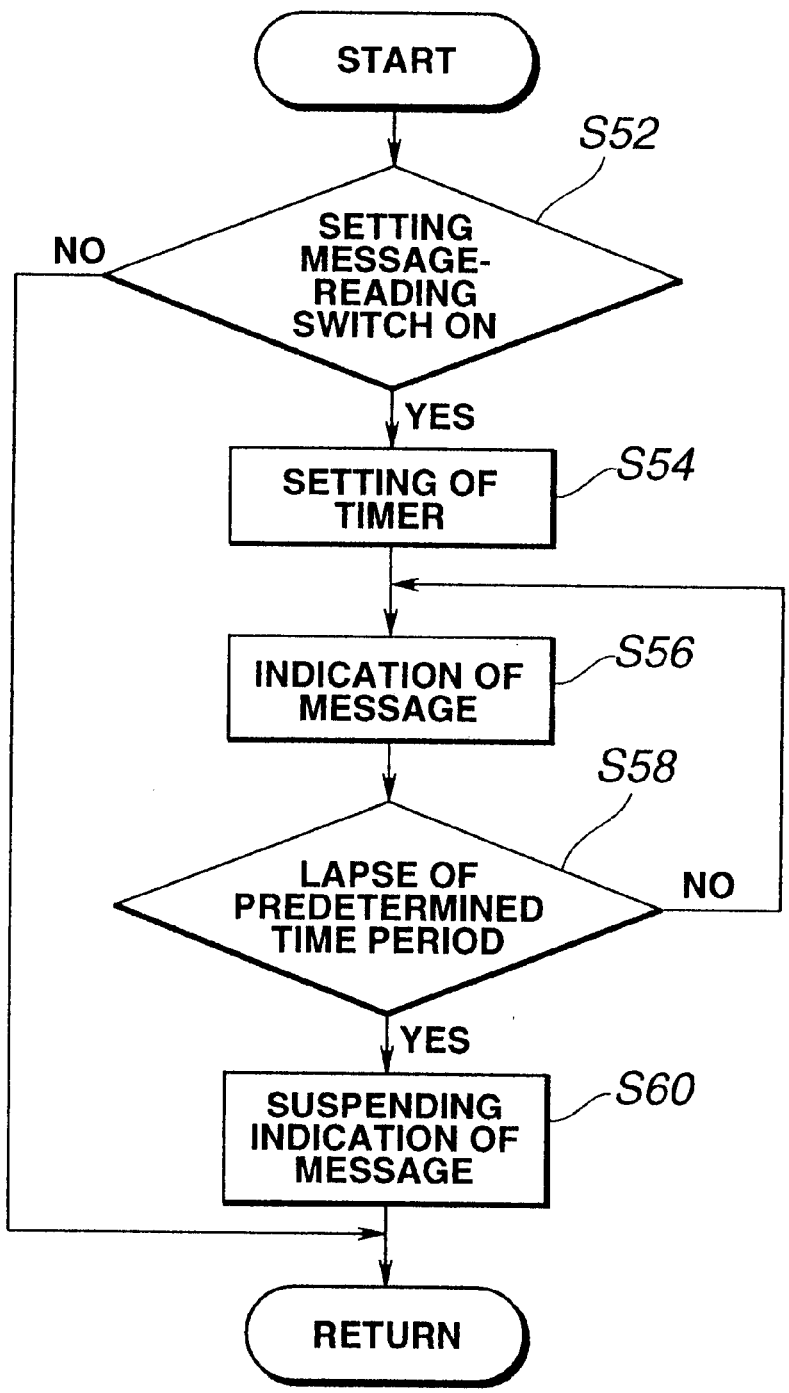
FIG. 6 is a flow chart explaining the read-out of messages from the calling device.

FIG. 6 is a flow chart describing the operations of the individual calling device when the holder looks at the message immediately after the calling sound or subsequently as stored in memory.

In the same drawing, when the device-holder pushes the message read-out switch (not illustrated) of input portion 17, a read-out flag is set up by an interruption processing, and CPU 14 detects the operation of the message read-out switch (S52, YES). CPU 14 starts the built-in timer for performing message indication for a predetermined period of time (S54). CPU 14 indicates the message stored in RAM 16 on LCD indicator 18. The indication continues until the period of time set in the built-in timer has lapsed (S56, S58; NO).

After the set period of time has lapsed (S58, YES), the message indication is suspended, and LCD indicator 18 returns to the original clock/calendar indication screen (S60).

In this way, in the embodiment above, when the personal calling signal (address) is detected in the received signal, the output of operation from CPU 18 to LCD indicator 18 is put off and the propagation route to the receiving system for the harmonic noise of the CPU is shut down. Thereafter, CPU 14 is subjected to high speed operation to perform message processing, and after the completion of message processing, the operation output to LCD indicator 18 is turned on to return to the indication state, and CPU 14 also returns to the low-speed operation. Therefore, the period wherein LCD indicator 18 performs no indications is a very short period from the detection of its personal calling signal (detection of arrival of call) up to the completion of message processing. This is preferable with devices such as portable calling devices with clock/calendar indications which perform constant LCD indications, because the period of time where no indications are made may be held to minimum.

The present invention is not only applicable to the POCSAG (post office code standardisation advisory group) method, but also to the FLEX method which performs interleaving.

In the embodiment mentioned above, the controller comprises a plurality of elements, the functions of which are realized by microcomputer system. These elements are the message processor, the indication limiter, the assistance information outputor, etc.. However, logical circuits realizing each of functions of such elements may be substituted for microcomputer system.

As described above, the portable individual calling device according to the present invention suspends operations of the LCD indicator after detecting its personal calling selective number and subjects the CPU to high speed operation, so that the time of turning off the LCD indication for prevention of signal-to-noise (S/N) reduction due to noises can be held considerably short, which is very preferable for calling devices of the type where the LCD is in a constant indication state.

I claim:

1. A portable individual calling device comprising:
   a receiver for receiving a radio signal including at least a selective calling number and message information via intermittent receiving operation, and for outputting said radio signal as a received signal of a predetermined format;
   a message indicator for indicating said message information;
   an address detector for detecting whether said received signal includes its personal selective calling number;
   a message processor for reading out said message information from said received signal in correspondence with the detection of said personal selective calling number and for performing processing of said message information; and
   an indication limiter for preventing said message indicator from indicating said message information for the period of time from the detecting of said personal selective calling number up to at least the completion of said processing of said message information.

2. A portable individual calling device according to claim 1, wherein said message processor comprises a microcomputer system which operates in a high speed mode and in a low speed mode, and which switches into the high speed mode of operation when (performs high speed calculation processing from the detection of) said personal selective calling number is detected and switches into the low speed mode upon the completion of said processing of said message information, and wherein said message indicator is an LCD indicator to be connected to the output port of said microcomputer system.

3. A portable individual calling device according to claim 2, wherein said indication limiter shuts down said output port to which said LCD indicator is connected, in correspondence with the detection of said personal selective calling number, and opens said output port after storing the message information processed via said message processor in a storage.

4. A portable individual calling device according to claim 1, wherein said indication limiter comprises an indication suspender for suspending indication operations of said message indicator in correspondence with the detection of said personal selective calling number, and a re-indicator for making said message indicator start operation after the completion of said processing.

5. A portable individual calling device according to claim 4, wherein said indication suspender shuts down said output port of said microcomputer system in correspondence with the detection of said personal selective calling number, and said re-indicator opens said output port after storing the message information subjected to data processing via said message processor in a storage.

6. A portable individual calling device according to claim 1, further comprising an assistance information outputor for outputting assistance information useful in utilizing the calling device, wherein said message indicator indicates said assistance information and said message information simultaneously or separately.

7. A portable individual calling device according to claim 6, wherein said assistance information includes at least one of the information regarding date, weekday, time, timer, or name and telephone number stored in memory.

8. A method for displaying a message corresponding to message information contained in a radio signal and other information indicating time and/or remaining battery power on a display employed in a portable communication apparatus, comprising the steps of:
   receiving a radio signal containing at least calling number information and message information;
   detecting if said radio signal contains a particular calling number information preliminary assigned to the apparatus;
   processing said message information upon said particular calling number information being detected in said radio signal;
   normally displaying either a message corresponding to said message information processed by said step of processing or said other information on the display; and
   interrupting said step of normally displaying during the period of time between said step of detecting and processing.

* * * * *